US008378999B2

(12) United States Patent
Fukuo

(10) Patent No.: US 8,378,999 B2
(45) Date of Patent: Feb. 19, 2013

(54) DRIVING CIRCUIT AND DATA DRIVER OF PLANAR DISPLAY DEVICE

(75) Inventor: Motoo Fukuo, Shiga (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 1072 days.

(21) Appl. No.: 11/898,584

(22) Filed: Sep. 13, 2007

(65) Prior Publication Data

US 2008/0068360 A1 Mar. 20, 2008

(30) Foreign Application Priority Data

Sep. 14, 2006 (JP) ................................ 2006-249766

(51) Int. Cl.
*G06F 3/038* (2006.01)
*G09G 5/00* (2006.01)

(52) U.S. Cl. .............. 345/204; 345/96; 345/97; 345/98; 345/99; 345/100; 345/211; 345/212; 365/189.05; 365/230.08

(58) Field of Classification Search .................. 345/204
See application file for complete search history.

(56) References Cited

U.S. PATENT DOCUMENTS

| | | | | |
|---|---|---|---|---|
| 6,785,173 | B2 * | 8/2004 | Sohn et al. | 365/201 |
| 7,253,810 | B2 * | 8/2007 | Ito et al. | 345/204 |
| 7,466,166 | B2 * | 12/2008 | Date et al. | 345/204 |
| 7,471,276 | B2 | 12/2008 | Tomohara | |

FOREIGN PATENT DOCUMENTS

| | | |
|---|---|---|
| JP | 8-22268 | 1/1996 |
| JP | 2002-108287 A | 4/2002 |
| JP | 2005-208505 A | 8/2005 |

OTHER PUBLICATIONS

Japanese Office Action dated Nov. 18, 2011 with an English translation.

* cited by examiner

*Primary Examiner* — Kevin M Nguyen
*Assistant Examiner* — Kenneth B Lee, Jr.
(74) *Attorney, Agent, or Firm* — McGinn IP Law Group, PLLC

(57) ABSTRACT

A clock signal, a data signal, and a latch signal are commonly supplied from a controller to a plurality of the data drivers. The data signal and the latch signal are synchronized with the clock signal. In each of the data drivers, an internal latch signal is generated in synchronization with the clock signal in response to the latch signal. Timing of a rising edge of the internal latch signal is independently controlled in each data driver in accordance with position information where each data driver is arranged.

13 Claims, 5 Drawing Sheets

| Chip NO | SEL1 | SEL2 | SEL3 |
|---|---|---|---|
| A | L | L | L |
| B | L | L | H |
| C | L | H | L |
| D | L | H | H |
| E | H | L | L |
| F | H | L | H |
| G | H | H | L |
| H | H | H | H |

DRIVING CIRCUIT AND DATA DRIVER OF PLANAR DISPLAY DEVICE

BACKGROUND OF THE INVENTION

1. Field of the Invention

The present invention relates to a driving circuit and data driver of a planar display device.

2. Description of Related Art

As a dot matrix display device, a liquid crystal display device has been used for various types of devices such as a personal computer because it has characteristics of thin, light, and low-power consumption. In particular, an active matrix color liquid crystal display device, which has an advantage in controlling high definition image quality, has been the mainstream of it.

A liquid crystal display module of this type of liquid crystal display device includes: a liquid crystal panel (LCD panel); a control circuit (hereinafter referred to as a controller) formed of a semiconductor integrated circuit device (hereinafter referred to as an IC); a scanning-side driving circuit (hereinafter referred to as a scanning driver) formed of the IC; and a data-side driving circuit (hereinafter referred to as "data driver"). In many cases, more than one data drivers are provided to a device. For example, if a resolution, of the liquid crystal panel is XGA (1024×768 pixels: one pixel is formed of three dots of R (red), G (green) and B (blue)), eight data drivers are arranged, each covering 128 pixels.

Each data driver converts digital data signals for one scanning line, which are supplied from the controller for each scanning line of the Liquid crystal panel (for each horizontal interval), into analog gradation voltages, and then applies the resultant digital data signals to a data line of the liquid crystal panel. As an internal fundamental circuit, each data driver has a shift register, a data register, a data latch circuit, and a driver circuit, while being cascade-connected by input and output of the shift register.

The controller commonly supplies a clock signal, a digital data signal and a latch signal to each data driver. Thus, a start signal is supplied to the first-stage data driver. The start signal supplied to the first-stage data driver is transferred to the cascade-connected second-stage data driver and the subsequent cascade-connected data drivers in a sequential manner, so that the eight shift registers of the eight data drivers can operate as one shift register. In response to the start signal, the shift register of each data driver outputs, to the data register, a shift pulse for fetching display data, which sequentially shift in synchronization with the clock signal. The data register of each data driver sequentially fetches the data signal in synchronization with the shift pulse. The data latch circuit of each data driver fetches the data signal supplied from the data register in synchronization with the latch signal, holds the fetched data signal until the latch signal is supplied for the next time, that is, for one horizontal interval, and outputs the data signal to the driver circuit. The driver circuit performs D/A conversion and amplification of the data signal from the data latch circuit, and then outputs the resultant data signal to the data line of the liquid crystal panel. At this time, the data latch circuit performs a fetching operation at the leading edge of the latch signal. At the same time of the fetching operation of the data latch circuit, the driver circuit disconnects the data output so as not to output, to the data line, the values in a transitional state of D/A converting. After that, the output of the driver circuit is connected to the data line at a trailing edge of the latch signal so as to output new data to the data line.

And now, in the above-mentioned liquid crystal display device, one latch signal supplied from the controller is commonly inputted to the data latch circuit of each data driver. For this reason, the data latch circuits of all the data drivers simultaneously perform a latch operation in synchronization with this latch signal. When the number of pixels increases, since the liquid crystal panel becomes to have higher definition image quality and a larger size, the number of stages of the latch configuring the data latch circuit also increases as an entire liquid crystal display device. When the above-mentioned latch operations are simultaneously performed by the data drivers under such a circumstance, currents relating to the latch operations of all the data drivers simultaneously flow to a power-supply line common in the display device, which results in increasing electro-magnetic interference (hereinafter referred to as "EMI").

Japanese Patent Application Laid-open publication No. 8-22268 discloses a technology to solve this problem. In this patent document, there is disclosed a liquid crystal driving circuit that fetches image data serially inputted in synchronization with a clock pulse and outputs in parallel a display output signal formed based on the serially-fetched image data according to a display timing signal. In this liquid crystal driving circuit, an output circuit and an output terminal are provided in addition to an input terminal, and multiple liquid crystal driving circuits are cascade-connected. In this liquid crystal display circuit, an internal wiring and an output circuit are used as delay means, so that the output timing of the display signal for, each liquid crystal driving circuit is temporally dispersed. Thus, the above-mentioned problem can be resolved. It is to be noted that in the example of Japanese Patent Application Laid-open publication No. 8-22268, in addition to the display timing signal, the image data and the clock pulse are sequentially transferred to each of the cascade-connected liquid crystal driving circuits through the delay means, instead of not commonly supplied to each of the liquid crystal display circuits. In this way, a relative temporal relationship between the display timing signal and the image data or the clock pulse is maintained, so as not to cause any problem in fetching the image data or the display output.

And now, in the technology disclosed in the above-mentioned Japanese Patent Application Laid-open publication No. 8-22268, a delay time of the display timing signal (latch signal) for each driver circuit is made by utilizing delay of the output circuit provided in each driver circuit. This delay time varies for each product driver circuit depending on manufacturing conditions, and its control is not easy. In addition, even in the same product driver circuits, this delay time varies depending on a temperature of the environment and a source voltage, and its control is also not easy.

On the other hand, to control the EMI of the display device, it is necessary to control in a manner that a resonance frequency as an EMI antenna, and an operation frequency are not equal. Here, Multiple EMI antennas are generally provided for each display device, and the operation frequency which periodically increases a source current of the driver circuit flowing through the power-supply lines of the device. However, by the technology disclosed in Japanese Patent Application Laid-open publication No. 8-22268, its control is not easy because of the above-described reason. As a result, there is a disadvantage in that the EMI of the display device cannot be prevented from occurring depending on the combination of the device and the driver circuit mounted thereon or the usage environment.

SUMMARY

A driving circuit of a planar display device of the present invention includes: a controller for outputting a latch signal;

and multiple data drivers to which the latch signal is commonly supplied and in which an internal latch signal is generated in response to the latch signal. This driving circuit is characterized in that each of its data drivers can independently control timing of the internal latch signal.

The data driver of the planar display device of the present invention includes: a shift register for generating a shift pulse in synchronization with a clock signal in response to a start signal; a data register for sequentially fetching data signal in synchronization with the shift pulse; and a data latch circuit for latching the data signal fetched into the data register. This data driver is characterized in that the timing of the latch can be controlled.

According to the present invention, in each of the plural data drivers, the timing of the internal latch signal can be independently controlled and the timing of the latch operation can be shifted between the plural data drivers. With this invention, the source current of the driver circuit, which flows through the power-supply lines of the device, can be generated in a different time for each driver circuit, and a peak value of the source current is suppressed low so as to minimize the intensity of generating the EMI. At the same time, its time difference is controlled by a frequency of an integral multiplication of a cycle of the clock signal so as to avoid having the resonance frequency of the display device, and thereby the generation of the EMI of the display device can be suppressed.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF THE PREFERRED EMBODIMENT

Figure 1:
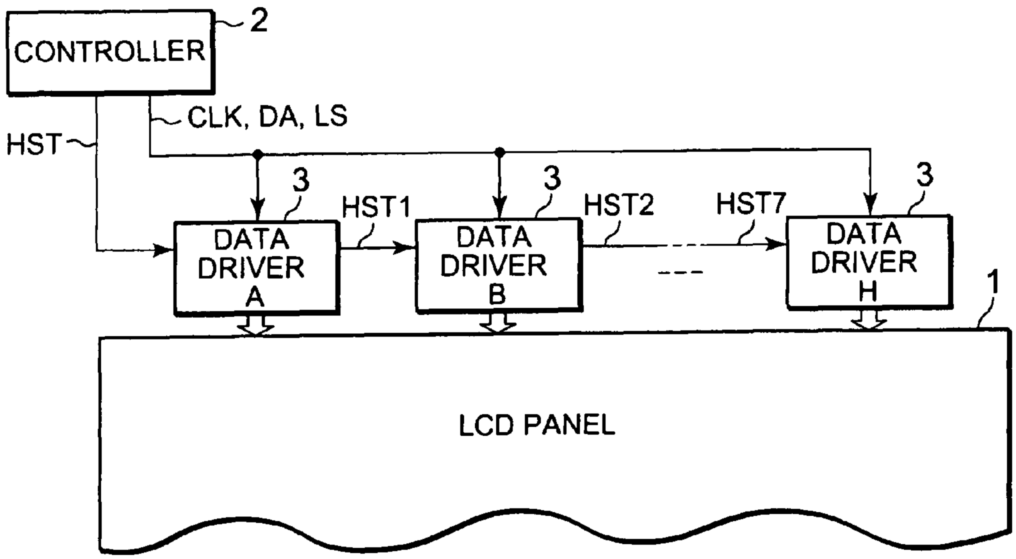
FIG. 1 is a configurational diagram of a driving circuit of a liquid crystal panel according to one embodiment of the present invention.

With reference to drawings, an embodiment of the present invention will be described below. FIG. 1 shows one embodiment of the present invention. A driving circuit of a liquid crystal panel 1 is provided with a controller 2 and data drivers 3. For example, eight of the data drivers 3 (A, B . . . , and H) are arranged by taking the case as an example where the liquid crystal panel 1 has a resolution of XGA (1024×768 pixels: one pixel is formed of three dots of R (red), G (green), and B (blue)) and each of the data drivers covers displaying 128 pixels (outputs 128×3 dots=384 outputs).

In each of the eight data drivers 3, a start signal HST is supplied from the controller 2 to a first-stage data driver A. The eight data drivers 3 are cascade-connected by cascade outputs HST1, HST2, . . . , HST7 from each of the data drivers 3. In addition, a clock signal CLK, a data signal DA, and a latch signal LS are commonly supplied from the controller 2 to each of the data drivers 3.

When the start signal HST is supplied from the controller 2 to the first-stage data driver A, the data driver A internally and sequentially generates shift pulses SP1, SP2, . . . to fetch data signal DA. The data drivers B, C, . . . , and H are sequentially supplied with cascade outputs HST1, HST2, . . . , HST7 and similarly fetch the data signal DA.

When the latch signal LS is supplied from the controller 2 to each data driver 3, an internal latch signal is generated inside each data driver 3. Each data driver 3 can independently control timing of the internal latch signal. Specifically, it is controlled in the following manner. The timing control is performed in synchronization with the clock signal CLK and is performed for the rising edge (leading edge) of the internal latch signal. The falling edge (trailing edge) of the internal latch signal occurs at the same timing. In addition, the timing control is performed based on information on position where each of the data drivers 3 is provided (A, B, . . . , and H). The position information can be defined by a setup terminal provided in each data driver. In addition, according to another means, the position information can be defined by a pulse width of the start signal inputted to each data driver 3. In this case, each data driver 3 sets a pulse width of a cascade output of the start signal to be wider by a width for one clock signal CLK than a pulse width of a cascade input. In this way, there is generated an internal latch signal which has rising edges of the data drivers A, B, . . . , and H, sequentially delayed in this order in synchronization with the clock signal CLK.

When the data signal DA is fetched into each data driver 3, each data driver 3 sequentially latches the data signal DA in synchronization with the rising edge of the internal latch signal. In addition, all the data drivers 3 have the same timing of the falling edge of the internal latch signal. In synchronization with this falling edge, all the data drivers 3 simultaneously output a gradation voltage that the data signal DA is D/A converted to the data line of the liquid crystal panel.

Figure 2:
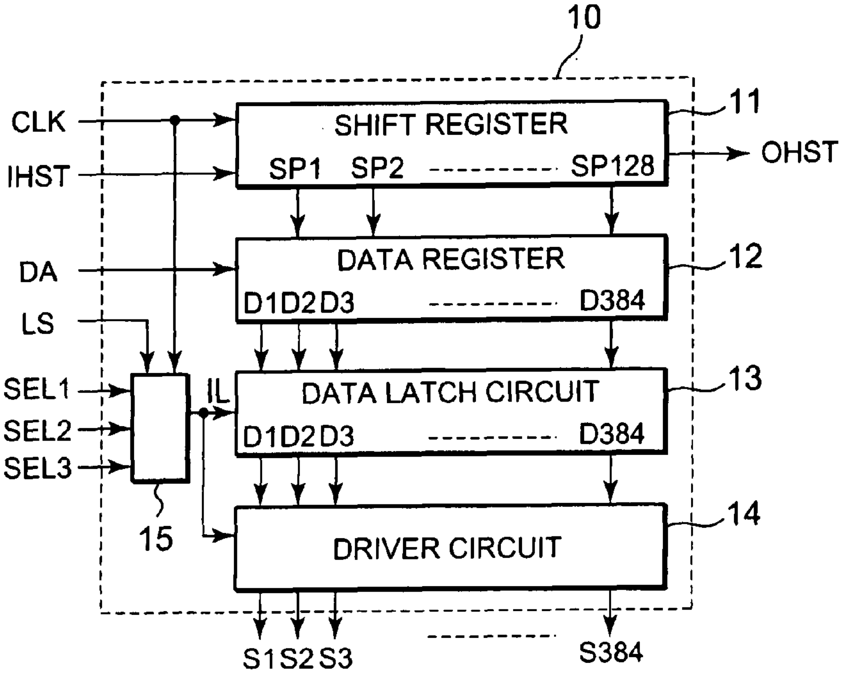
FIG. 2 is a block diagram showing a configuration of a data driver of a first example used for the driving circuit shown in FIG. 1.

FIG. 2 shows a data driver 10 of a first example, which is applied as the data driver 3. As shown in FIG. 2, as a general fundamental circuit, the data driver 10 is provided with a shift register 11, a data register 12, a data latch circuit 13, and a driver circuit 14. The driver circuit 14 includes a level shifter, a D/A converter, and an output amplifier (not shown).

The brief description will be given of a general basic operation of the above-mentioned fundamental circuit. The shift register 11 sequentially outputs, to the data register 12, shift pulses SP1 to SP128 in synchronization with the clock signals CLK in response to a start signal IHST and outputs a start signal OHST to the next stage. During one horizontal interval, the data register 12 sequentially fetches thereinto the data signal DA for one scanning line of the liquid crystal panel 1, for example, for every pixel in synchronization with the sift pulses SP1 to SP128 from the shift register 11. In response to the rising edge of the internal latch signal IL created from the latch signal LS, the data latch circuit 13 fetches the data signal DA supplied from the data register 12, holds the fetched data signal DA until the next rising edge of the internal latch signal IL, that is, for one horizontal interval, and outputs the resultant data signal DA to the driver circuit 14. The driver circuit 14 D/A converts and amplifies the data signal DA from the data latch circuit 13, and then simultaneously outputs the resultant data signal DA in synchronization with the falling edge of the internal latch signal IL.

Figures 3, 4:
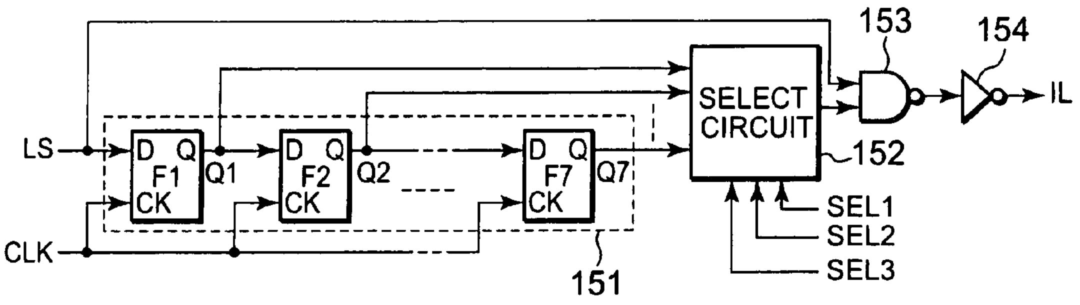
FIG. 3 is a block diagram showing a configuration of an internal latch signal generation circuit used for the data driver shown in FIG. 2.
FIG. 4 is a table of setting up selection signals of the internal latch signal generation circuit shown in FIG. 3.
Figure 5:
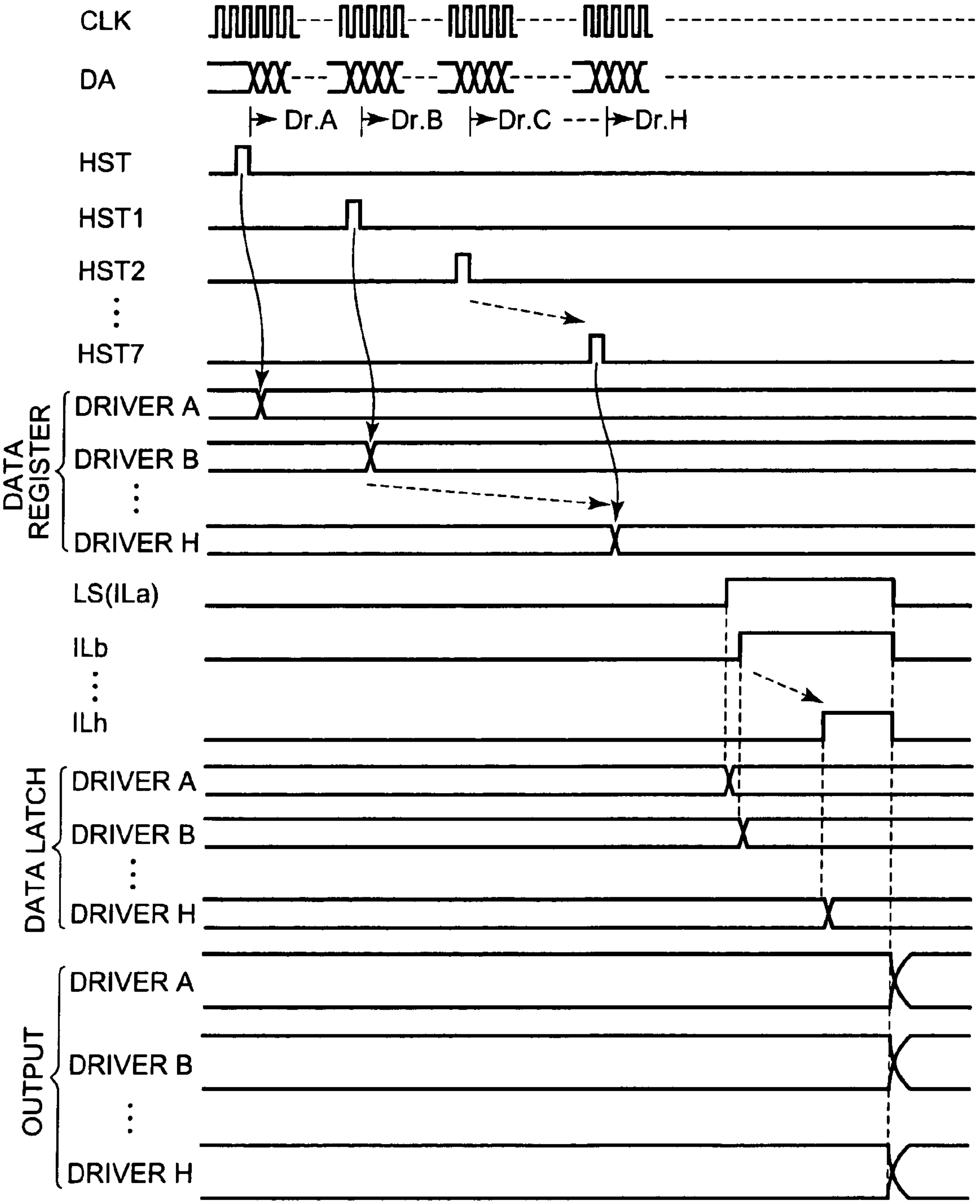
FIG. 5 is a diagram showing operations when the data driver shown in FIG. 2 is used for the driving circuit shown in FIG. 1.

As shown in FIG. 2, the data driver 10 further includes an internal latch signal generation circuit 15 for inputting the internal latch signal IL to the data latch circuit 13 after being received the latch signal LS from the outside. The present invention is characterized by including the internal latch signal generation circuit 15. A configuration and detailed description thereof will be given below. The internal latch signal generation circuit 15 is a circuit for selectably outputting to the data latch circuit 13 the internal latch signals ILa, ILb, . . . , ILh, which are sequentially delayed as shown in FIG. 5 from the latch signal LS in synchronization with the clock signal CLK. As shown in FIG. 3, the internal latch signal generation circuit 15 includes a shift register 151, a select circuit 152, a NAND circuit 153, and an inverter 154.

The shift register 151 is formed of seven-stage flip-flops F1 to F7 which are made of a D flip-flop (DFF) and cascade-connected. The latch signal LS is inputted to a data terminal D of the first-stage flip-flop F1, and output pulses Q1 to Q7 from the flop-flops F1 to F7 are inputted to the select circuit 152. The timing of the rising edges of the output pulses Q1 to Q7 sequentially shifts for one clock signal CLK from the latch signal LS, and the timing of the falling edges thereof is the same as that of the latch signal LS.

The select circuit 152 is set so that an "H" level and one of the output pulses Q1 to Q2 of the shift register 151, would be selected by the inputs of the selection signals (setup terminals) SEL1, SEL2, and SEL3, which are defined as the position information where each data driver 10 is arranged. The H or L level is inputted to the selection signals (setup terminals) SEL1, SEL2, and SEL3 so that the rising edge of the output of the select circuit 15 would be sequentially delayed corresponding to the data drivers 10 so as to be cascade-connected in the order of A, B, . . . , and H. The selection signals (setup terminals) SEL1, SEL2, and SEL3 of each data driver 10 are set as shown in FIG. 4 by performing the setting of "H" or "L" level on a substrate of the liquid crystal panel.

The latch signal LS and the output of the select circuit 152 are inputted to the NAND circuit 153, and the NAND circuit 153 selects and outputs one of the internal latch signals ILa, ILb, . . . , ILh through the inverter 154.

The operation of the internal latch signal generation circuit 15 will be described below.

(When it is applied to the data driver A) As shown in FIG. 4, the setup terminals SEL1, SEL2, and SEL3 are respectively set to "L, L, and L" levels. The output of the select circuit 152 becomes the "H" level (none of the output pulses Q1 to Q7 of the shift register 151 is selected). For this reason, the NAND circuit 153 functions as the inverter to which the latch signal LS is inputted. The internal latch signal ILa having the same timing as that of the latch signal LS is outputted from the internal latch signal generation circuit 15.

(When it is applied to the data driver B) As shown in FIG. 4, the setup terminals SEL1, SEL2, and SEL 3 are respectively set to "L, L, and H" levels. The select circuit 152 selects the output pulse Q1. Accordingly, the NAND circuit 153 functions as the inverter to which the output pulse Q1 is inputted. The internal latch signal ILb having the same timing as that of the output pulse Q1 is outputted from the internal latch signal generation circuit 15. In other words, the timing of the rising edge of the internal latch signal ILb is delayed for one clock signal CLK from that of the latch signal LS, and the timing of the falling edge thereof becomes the same timing as that of the latch signal LS.

When the setup terminals SEL1, SEL2, and SEL 3 are set as shown in FIG. 4 in the case where the internal latch signal generation circuit 15 is applied to the data drivers C, . . . , and H, the select circuit 152 selects each of the output pulses Q2 to Q7. Accordingly, the NAND circuit 153 functions as the inverter to which each of the output pulses Q2 to S7 is inputted, and the internal latch signals ILc to ILh having the same timing as that of the output pulses Q2 to Q7 are outputted from the internal latch signal generation circuit 15. In other words, the rising edges of the internal latch signals ILc to ILh are respectively delayed for two to seven clock signals CLK from the rising edge of the latch signal LS, and the falling edge thereof becomes the same timing as that of the latch signal LS.

With reference to FIG. 5, the description will be given of the operation of the driving circuit of the liquid crystal panel when each data driver 10 is applied to each of the data drivers 3 (A, B, . . . , and H). The setup terminals SEL1, SEL2, and SEL3 of each data driver 10 are set in advance to an "H" or "L" level on the substrate of the liquid crystal panel corresponding to the data drivers 10 to be cascade-connected in the order of A, B, . . . , and H. When the start signal HST is supplied from the controller 2 to the first-stage data driver 10(A), cascade outputs HST1, HST2, . . . , and HST7 are sequentially transferred from the data driver A to the data driver B, from the data driver B to the data driver C, . . . , and the data driver G to the data driver H. At the same time, the data signal DA sequentially fetched into each data driver 10. When the latch signal LS is inputted to the internal latch signal generation circuit 15 of each data driver 10, the internal latch signals ILa, ILb, . . . , ILh having rising edges which are sequentially delayed in synchronization with the clock signal CLK are outputted from the internal latch signal generation circuit 15 to the data latch circuit 13. The data latch circuit 13 of each data driver 10 sequentially latches the data signal DA in synchronization with the rising edges of the internal latch signals ILa, ILb, . . . , and ILh. Then, the timing of the falling edges of the internal latch signals ILa, ILb, . . . , ILh of the data drivers 10 is the same. In synchronization with the falling edge, a gradation voltage that the data signal DA is D/A converted is simultaneously outputted from all the data drivers 10 to the data line of the liquid crystal panel 1.

As described above, the selection signals (setup terminals) SEL1, SEL2, and SEL3 of each data driver 10 are set on the substrate of the liquid crystal panel, and the setting is performed corresponding to the order of the cascade connection of the data drivers 10. With this setting, the timing of the rising edges of the internal latch signals ILa, ILB, . . . , and ILH can be sequentially delayed in synchronization with the clock signal CLK. Accordingly, while a relative temporal relationship between the clock signal and the internal latch signal is maintained, the timing of the latch operation can be shifted between the data drivers 10. In this way, it becomes possible that the generation of the EMI is suppressed without causing any trouble in the latch operation.

In the example of FIG. 3, it is set that the latch operation is performed in the order of the arranged data drivers 10. However, as long as it is set that the latch operation is performed without being overlapped between the data drivers 10, any order is possible. In addition, if there is no MEI problem, it can be also set in such a manner that the data drivers 10 are divided into several groups and the latch is sequentially performed for each group. In addition, in this example, each data driver is delayed only for a cycle of one clock signal, but if the number of stages of the shift registers is increased to prepare the corresponding number of selection signal terminals SEL, it is possible that any data driver can be delayed for any period of time of an integral multiplication of one clock cycle. At this time, if differences of the operation times of the data drivers are set so as not to be equal, the generation of the EMI depending on the cycle of the latch time difference can be also suppressed.

Figure 6:
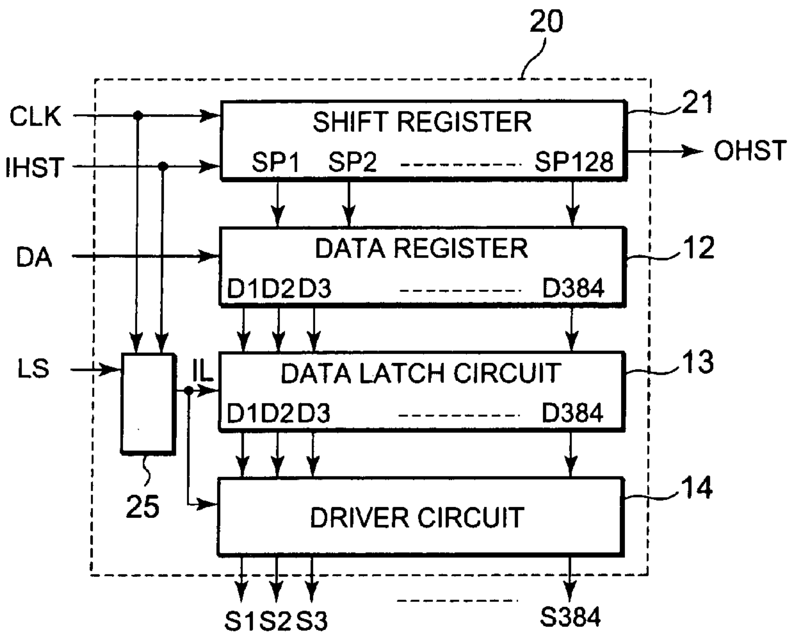
FIG. 6 is a block diagram showing a configuration of a data driver of a second example used for the driving circuit shown in FIG. 1.

FIG. 6 shows a data driver 20 of a second example, which is applied as a data driver 3. The same reference numerals are given to denote the same components as those of FIG. 2, and the description thereof will be omitted. As shown in FIG. 6, similar to the data driver 10, the data driver 20 includes a data register 12, a data latch circuit 13, and a driver circuit 14.

As shown in FIG. 6, the data driver 20 further includes a shift register 21 and an internal latch signal generation circuit 25 in place of the shift register 11 and the internal latch signal generation circuit 15. The present invention is characterized by including the shift register 21 and the internal latch signal generation circuit 25. A configuration and operation thereof will be described in detail below. Similar to the shift register 11, the shift register 21 sequentially outputs shift pulses SP1 to SP128 to the data register 12. The point that the shift register 21 is different from the shift register 11 is that the pulse widths of the start signals IHST and OHST are equal in the case of the shift register 11, whereas the pulse width of the start signal OHST is set wider by one clock signal CLK than the pulse width of the start signal HST in the case of the shift register 21.

Figure 7:
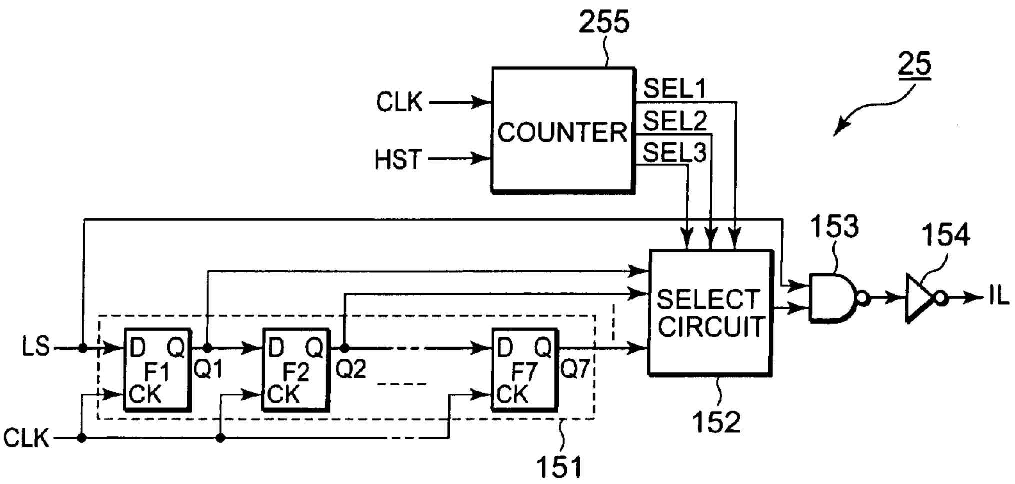
FIG. 7 is a block diagram showing a configuration of an internal latch signal generation circuit used for the data driver shown in FIG. 6.

As shown in FIG. 7, the point that the internal latch signal generation circuit 25 is different from the internal latch signal generation circuit 15 is that a counter 255 for generating selection signals SEL1, SEL2, and SEL 3 is included.

The counter 255 counts the pulse width of the start signal HST and generates three-bit selection signals SEL1, SEL2, and SEL3. Similar to the internal latch signal generation circuit 15, the selection signals SEL1, SEL2, and SEL3 are supplied to the select circuit 152.

The operation of the internal latch signal generation circuit 25 will be described.

(When it is applied to the data driver A) When the start signal HST with one CLK width is inputted to the counter 255, the selection signals SEL1, SEL2, and SEL3 are respectively outputted with "L, L, and L" levels, as shown in FIG. 4, to the select circuit 152. The following operation is similar to that of the internal latch signal generation circuit 15, and the description thereof will be omitted.

(When it is applied to the data driver B) When the cascade output HST1 with 2-CLK width is inputted to the counter 255, the selection signals SEL1, SEL2, and SEL3 are respectively outputted with "L, L, and H" levels, as shown in FIG. 4, to the select circuit 152. The following operation is similar to that of the internal latch signal generation circuit 15, and the description thereof will be omitted.

Also, in the case where it is applied to the data drivers C, . . . , and H, when cascade outputs HST2 to HST7 with three to eight CLK widths are inputted to the counter 255, the selection signals SEL1, SEL2, and SEL 3 are outputted to the select circuit 152 as shown in FIG. 4. The following operation is similar to that of the internal latch signal generation circuit 15, and the description thereof will be omitted.

Figure 8:
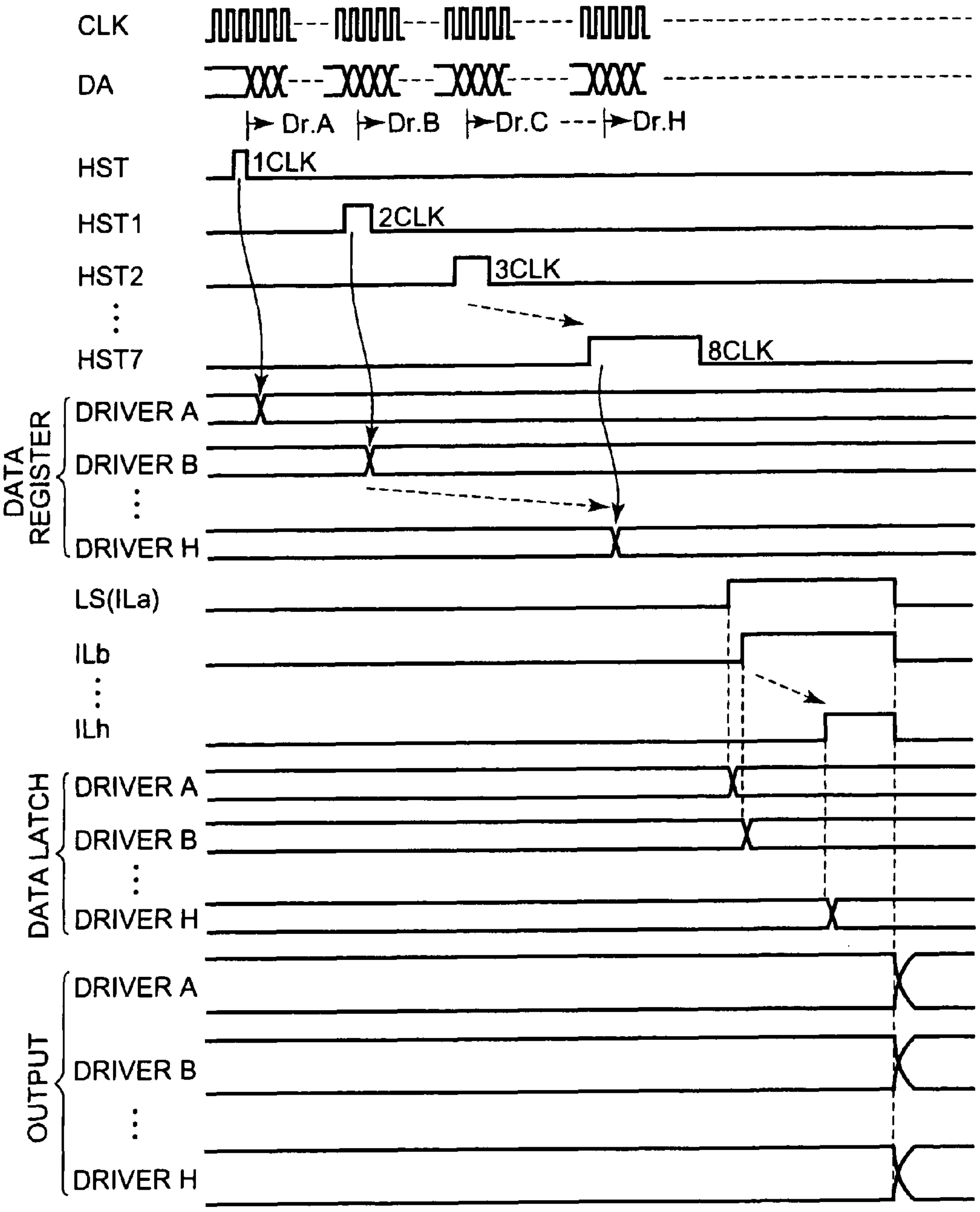
FIG. 8 is a diagram showing operations when the data driver shown in FIG. 6 is used for the driving circuit shown in FIG. 1.

With reference to FIG. 8, the description will be given of the operation of the driving circuit of the liquid crystal panel in a case where each data driver 20 is applied to each of the data drivers 3 (A, B, . . . , and H). When the start signal HST is supplied from the controller 2 to a first-stage data driver 20 (A), cascade outputs HST1, HST2, . . . , and HST7 with two to eight CLK widths are sequentially transferred from the data driver A to the data driver B, from the data driver B to the data driver C, . . . , and from the data driver G to the data driver H. When the start signal HST and the cascade outputs HST1, HST2, . . . , HST7 are inputted to each data driver 20, in each data driver 20, the data signal DA is fetched into the data register 12. At the same time, the selection signals SEL1, SEL2, and SEL3 of the internal latch signal generation circuit 25 to the selector 152 are set corresponding to the order of the data drivers 20 to be cascade-connected. The following operation is similar to the case of the data driver 10, and the description thereof will be omitted.

As described above, in each data driver 20, the selection signals SEL1, SEL2, and SEL3 are set by the start signal HTS and the cascade outputs HST1, HST2, . . . , HST7, and the setting is performed corresponding to the order of the data drivers 20 to be cascade-connected. With this setting, similar to the case where the data driver 10 is applied, the generation of the EMI can be suppressed. In the data driver 20, the external setup terminals SEL1, SEL2, and SEL3 are unnecessary, which are needed for the data driver 10, and there is no need to increase the number of external terminals.

In this example, the clock width is widened in the order of the cascade connection of the data drivers 20. However, it is also possible to have a width of eight clocks or more at the beginning, and then to shorten it. In addition, in this example, the latch timing is sequentially delayed, but it is also possible to delay the first latch timing and then to sequentially hasten it. Moreover, similar to the first example, it is possible to set a time difference by an integral multiplication of one clock.

What is claimed is:

1. A driving circuit of a planar display device, the driving circuit comprising:
- a controller configured to output a latch signal; and
- a first and a second data driver configured to receive the latch signal,
- wherein each of the first and the second driver comprises:
  - a data register configured to fetch a display data;
  - a data latch circuit configured to latch the display data from the data register in response to a leading edge of an internal latch signal;
  - a driver circuit configured to output the display data in response to a trailing edge of the internal latch signal; and
  - an internal latch signal generation circuit configured to receive the latch signal to generate the internal latch signal,
- wherein the internal latch signal generation circuit comprises:
  - a delay latch signal generator configured to receive the latch signal to generate at least first and second delay latch signals; and
  - a selector configured to select, based on a select signal, one of the first and second delay latch signals as a signal corresponding to the internal latch signal,
- wherein a leading edge of the first delay latch signal is delayed for a first period from a leading edge of the latch signal, and
- wherein a leading edge of the second delay latch signal is delayed for a second period from the leading edge of the latch signal, the second period being different from the first period.

2. The driving circuit according to claim 1, wherein the delay latch signal generator does not delay a trailing edge of the latch signal to generate the first and second delay latch signals.

3. The driving circuit according to claim 1, wherein a data latch timing of the data latch circuit is different from a data output timing of the driver circuit.

4. A data driver, comprising:

a data register configured to fetch a display data;

a data latch circuit configured to latch the display data from the data register in response to a leading edge of an internal latch signal;

a driver circuit configured to output the display data in response to a trailing edge of the internal latch signal: and an internal latch signal generation circuit configured to receive a latch signal to generate the internal latch signal, wherein the internal latch signal generation circuit comprises:

a delay latch signal generator configured to receive the latch signal to generate at least first and second delay latch signals; and a selector configured to select, based on a select signal, one of the first and second delay latch signals as a signal corresponding to the internal latch signal, wherein a leading edge of the first delay latch signal is delayed for a first period from a leading edge of the latch signal, and wherein a leading edge of the second delay latch signal is delayed for a second period from the leading edge of the latch signal, the second period being different from the first period.

5. The data driver according to claim 4, wherein a data latch timing of the data latch circuit is different from a data output timing of the driver circuit.

6. The data driver according to claim 4, wherein the delay latch signal generator does not delay a trailing edge of the latch signal to generate the first and second delay latch signals.

7. The driving circuit according to claim 1, wherein the internal latch signal generation circuit further comprises:

a counter configured to receive a clock signal and a start signal to generate the select signal.

8. The driving circuit according to claim 7, wherein the start signal includes a pulse with a predetermined pulse width, and wherein the counter counts the pulse width of the start signal based on the clock signal, and generates the select signal corresponding to a count value.

9. The driving circuit according to claim 8, wherein the start signal received by the counter in the first data driver comprises a first start signal, wherein the start signal received by the counter in the second data driver comprises a second start signal, and wherein a pulse width of the first start signal is different from that of the second start signal.

10. The driving circuit according to claim 4, wherein the internal latch signal generation circuit further comprises:

a counter configured to receive a clock signal and a start signal to generate the select signal.

11. The driving circuit according to claim 10, wherein the start signal includes a pulse with a predetermined width, and wherein the counter counts a pulse width of the start signal based on the clock signal, and generates the select signal corresponding to a count value.

12. The driving circuit according to claim 1, wherein each of the first data driver and the second data driver independently controls a timing of the internal latch signal.

13. The data driver according to claim 4, wherein said data driver comprises a plurality of data drivers, each of the plurality of data drivers controlling a timing of the internal latch signal independent of other ones of the data drivers.

* * * * *